Patented Jan. 5, 1943

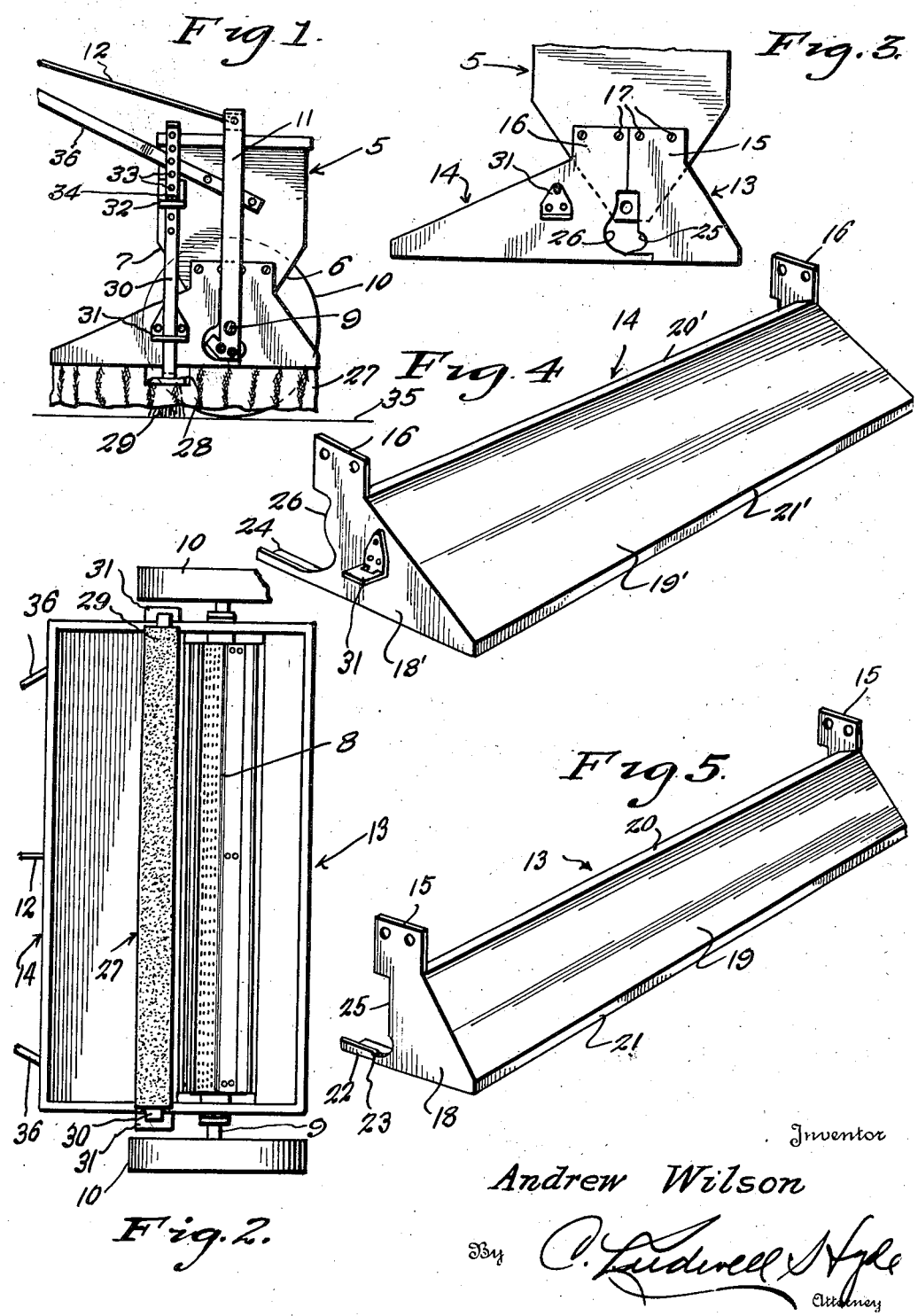

2,307,313

UNITED STATES PATENT OFFICE 2,307,313

MATERIAL DISTRIBUTOR

Andrew Wilson, Springfield, N. J., assignor to Andrew Wilson, Inc., Springfield, N. J., a corporation of New Jersey Application September 24, 1940, Serial No. 358,162

3 Claims. (Cl. 275—2)

My invention relates to improvements in material distributors adapted for spreading or distributing insecticides, fertilizer, sand, grass seed, lime and other powder or granular material over lawns and other surfaces, and the primary object of my invention is to provide an arrangement of this character wherein dust is prevented from rising from the material as it is discharged and spread on the ground and the material thus deposited on the ground is brushed off the grass or other projections onto the soil so as to be more effective for the purpose for which the material is applied.

Another important object of my invention is to provide means whereby insecticide material in powdered or granular form may be more quickly and economically applied to turf infected with chinch bugs and the like without danger or personal inconvenience to the operator from poisonous dusts given off by the material.

Another important object of my invention is to provide an attachment for distributors of the type exemplified by that shown in Patent No. 1,912,988, granted on June 6, 1933, to Edwin L. Masters, whereby this type of distributor is quickly, easily, and inexpensively converted to accomplish the actions mentioned above.

Other important objects and advantages of my invention will be apparent from the following description and the appended drawing wherein I have shown a preferred embodiment of my invention.

In the drawing:

Figure 1 is a fragmentary right-hand side elevational view of the embodiment.

Figure 2 is an enlarged fragmentary bottom plan view of Figure 1 with the skirt removed.

Figure 3 is an enlarged fragmentary right-hand side elevational view showing the hopper and the hood sections attached thereto in assembled relation.

Figure 4 is a rear perspective view of the rear hood section.

Figure 5 is a front perspective view of the front hood section.

The type of distributor referred to comprises a transversely elongated generally rectangular hopper or container 5 for receiving and containing the material to be distributed. The forward and rear sides of the lower part of the hopper converge at 6 and 7, respectively, to define a narrow material-discharge opening below which projects the perforated rearwardly declining plate 8, with a valve arrangement controlling the passage of material through the said opening onto said plate for even deposit on the turf or ground. A rotary agitator, mounted on an axle shaft 9 journalled through the side walls of the hopper, works in the hopper just above the valve for feeding the material evenly to the valve, and the outside ends of the axle shaft have ground engaging wheels 10 fixed thereon which support the hopper in spaced relation to the ground. An inverted U-shaped yoke 11, journalled on the outside ends of the axle shaft has its legs connected to the valve, and a reach rod 12, extending to within convenient reach of the operator, is connected to the bight portion of the yoke whereby the position of the yoke can be changed to adjust the valve to determine the rate of discharge of the material from the hopper.

In the operation of a distributor of the character above outlined, the material can be efficiently and evenly discharged at a selected rate, but a goodly percentage of the material so deposited on a lawn, for instance, clings to the blades of grass and burns, or otherwise undesirably affects the grass, and much less than the desired proportion of the material distributed is actually deposited on and reaches the soil where it is wanted. At the same time, in the operation of this type of distributor, especially where dry and finely granulated material is being applied to the ground, the dust incident to discharge of the material from the hopper exhibits a tendency to undesirably cover the blades of grass and fail to reach the ground. When a breeze or wind is blowing, this dust is carried about undesirably and wasted and may soil the clothes of the operator.

In accordance with the present invention these and other objectionable features of present distributors are eliminated by the provision of a readily attachable hood, brush, and apron combination. The hood is composed of a front section 13 and a rear section 14, having similar pairs of ears 15, 15 and 16, 16, respectively, which are attached by bolts or the like 17 to the outside of the opposite sides of the lower part of the hopper 5, in side-by-side position, as shown in Figure 3 of the drawing, with their adjacent edges meeting.

The front hood section 13 consists of substantially right triangular end walls 18, from the apex of which rise the ears 15. A declining front wall 19 extends between the end walls 18 flush with the hypotenuse edge thereof with a horizontal flange 20 on its upper edge and a vertical flange 21 on its lower edge. Horizontally aligned with the base edges of the end walls 18 are angle iron arms 22 which project rearwardly to be slidably received within the sides of similar arms 24 projecting forwardly from the rear hood section 14. The arms 22 have the side wall thereof indented to define the stop 23 to be engaged by the front ends of the related angle iron arms on the rear hood section.

The rear hood section 14 is substantially similar to the front hood section except that the ends 18' are substantially longer and the declining wall 19' is correspondingly wider, whereby the rear section projects rearwardly from the hopper 5 a proportionately greater distance than the front section projects forwardly from the hopper. The confronting edges 25 and 26 of the sections are suitably cut away to provide clearance for the operation of the valve mechanism of the arms of the yoke 11.

When assembled on the hopper, the horizontal flanges 20, 20' of the sections engage the angulated front and rear walls of the hopper to cooperate with the ends 18 and 18' in forming a close-fitting enclosure. The lower edges of the sections are spaced sufficiently above the ground to pass over the grass or other projections on the ground. If desired a fabric or similar flexible material skirt 27 may be secured (as shown in Figure 1) to depend from all four sides of the bottom of the hood to lightly sweep the grass or the like and to further confine within the hood the dust and other particles of discharged material as it is being distributed in the passage of the distributor over the ground.

For positively brushing the blades of grass or the like to remove from them proportions of the material deposited thereon and to cause the material thus removed to fall on the soil, I provide a brush 27 consisting of a transversely elongated plate 28 having suitable soft bristles 29 depending therefrom, the opposite end portions of the plate 28 having flat bars 30 rising therefrom alongside of the ends of the rear hood section as shown in Figure 1 of the drawing. These bars slide vertically through brackets 31 secured to the ends of the rear hood section and through other similar brackets 32 fastened to the upper part of the sides of the hopper 5. The bars 30 have vertically spaced holes 33 at their upper ends to receive a detent pin 34 on the brackets 32 adapted to hold the bars 30 and hence the brush 27 at a selected elevation with respect to the ground 35, so as to be effective without bruising the grass, or so as to be altogether out of engagement with the grass when desired. The usual hopper handle arrangement 36 extends rearwardly from the hopper to enable the operator to push and guide the distributor over the ground in the ordinary way while accomplishing the superior results outlined herein.

Although I have shown and described in detail herein a preferred embodiment, it is to be understood that I do not wish to limit the invention thereto, except as maybe required by the scope of the subjoined claims.

Having described the invention what is claimed as new is:

1. A distributor of the character described, said distributor comprising a wheeled hopper for containing the material to be distributed, aperture means at the lower part of said hopper for gravitationally discharging the material, and a hood mounted on the lower part of said hopper around said aperture means for confining the discharged particles of material to a selected area of the ground, said hood being suspended by removable connections to intermediate portions of the lateral end walls of the hopper, and a horizontal, transversely extending brush mounted on said hood and disposed underneath the same to the rear of said aperture means for brushing off material discharged by said aperture means on grass or the like and depositing the same on the soil, and means supportably connected to the lateral end walls of the hood for adjusting the elevation of said brush with respect to the ground.

2. A hood for attachment to depend from the lower part of the hooper of a distributor of the character described said hood consisting of a front section and a rear section, said sections engaging the front and rear walls, respectively, of the hopper and having interengaging elements at the opposite sides of the hopper, each of said sections consisting of a pair of end walls for outside engagement with the opposite sides of the hopper with a transverse wall connected to and extending between said end walls, said end walls being substantially right triangular in shape with the said transverse walls arranged flush with the hypotenuse edges of said end walls and declining forwardly and rearwardly, respectively, with respect to the front and rear of the hopper.

3. A hood for attachment to depend from the lower end of the hopper of a distributor of the class described, said hood comprising a front section and a rear section for positioning at the front and at the rear, respectively, of the lower end of the hopper, substantially horizontal slide brackets formed on and projecting from the sections toward each other, said slide brackets being overlapped in mutually supporting relation in different positions of adjustment of the sections toward and away from each other, vertical portions on said sections above said slide brackets, and attaching means on the said lateral end walls of the hopper supportably engaging said vertical portions of the hood sections to hold the hood sections assembled in position on the hopper.

ANDREW WILSON.